United States Patent
Sallette

[19]

[11] Patent Number: 6,155,840
[45] Date of Patent: Dec. 5, 2000

[54] SYSTEM AND METHOD FOR DISTRIBUTED LEARNING

[75] Inventor: Alfred V. Sallette, San Jose, Calif.

[73] Assignee: At Home Corporation, Redwood City, Calif.

[21] Appl. No.: 09/156,335

[22] Filed: Sep. 18, 1998

[51] Int. Cl.⁷ .................................................. G09B 7/00
[52] U.S. Cl. ......................... 434/323; 434/350; 434/362; 709/204; 709/203; 709/219; 709/231
[58] Field of Search ..................................... 434/350, 118, 434/362, 323, 345, 302, 328, 146; 709/1, 203, 204, 219, 231; 706/927; 707/502, 501

[56] References Cited

U.S. PATENT DOCUMENTS

| | | | |
|---|---|---|---|
| 4,715,818 | 12/1987 | Shapiro et al. | 434/118 X |
| 4,785,472 | 11/1988 | Shapiro | 379/96 X |
| 5,002,491 | 3/1991 | Abrahamson et al. | 434/322 X |
| 5,295,836 | 3/1994 | Ryu et al. | 434/335 X |
| 5,318,450 | 6/1994 | Carver | 434/336 X |
| 5,347,306 | 9/1994 | Nitta | 348/15 X |
| 5,601,436 | 2/1997 | Sudman et al. | 434/307 R X |
| 5,727,950 | 3/1998 | Cook et al. | 434/350 |
| 5,782,642 | 7/1998 | Goren | 434/307 R X |
| 6,021,119 | 2/2000 | Derks et al. | 434/350 X |
| 6,064,856 | 6/2000 | Lee et al. | 434/350 X |
| 6,065,042 | 5/2000 | Reimer et al. | 709/203 X |
| 6,070,185 | 5/2000 | Anupam et al. | 709/204 X |
| 6,078,948 | 6/2000 | Podgorny | 709/204 X |

Primary Examiner—Jessica J. Harrison
Assistant Examiner—Chanda Harris
Attorney, Agent, or Firm—Fenwick & West LLP

[57] ABSTRACT

A system and method for distributed learning that includes a distributed learning server coupled to presenter and audience computer systems via a network such as the Internet. The distributed learning server includes control, classroom environment, and streaming data modules. The control module controls interactions between the presenter and audience computer systems, controls the operation of the classroom environment and streaming data modules, and authenticates the users of the presenter computer systems. The control module also allows the presenter to set up a presentation and pre-select streaming data sources that will be used in the presentation. The classroom environment module provides a classroom metaphor having a podium and rows of seats to the presenter and audience computer systems. The streaming data module allows multiple streaming data feeds, such as digital video, to be sent from one computer system coupled to the distributed learning server to the other computer systems. The presenter and audience computer systems are preferably industry-standard computer systems executing JAVA-compatible web browsers connected to the distributed learning server. The presenter computer system displays a content selection region for selecting among data feeds, a first streaming media region for showing a first selected data feed, and a second streaming media region for showing a second selected data feed. The audience member computer system displays a presentation/feedback region for viewing presentation text and providing feedback to the presenter and first and second streaming media regions for viewing the data feeds selected by the presenter.

24 Claims, 7 Drawing Sheets

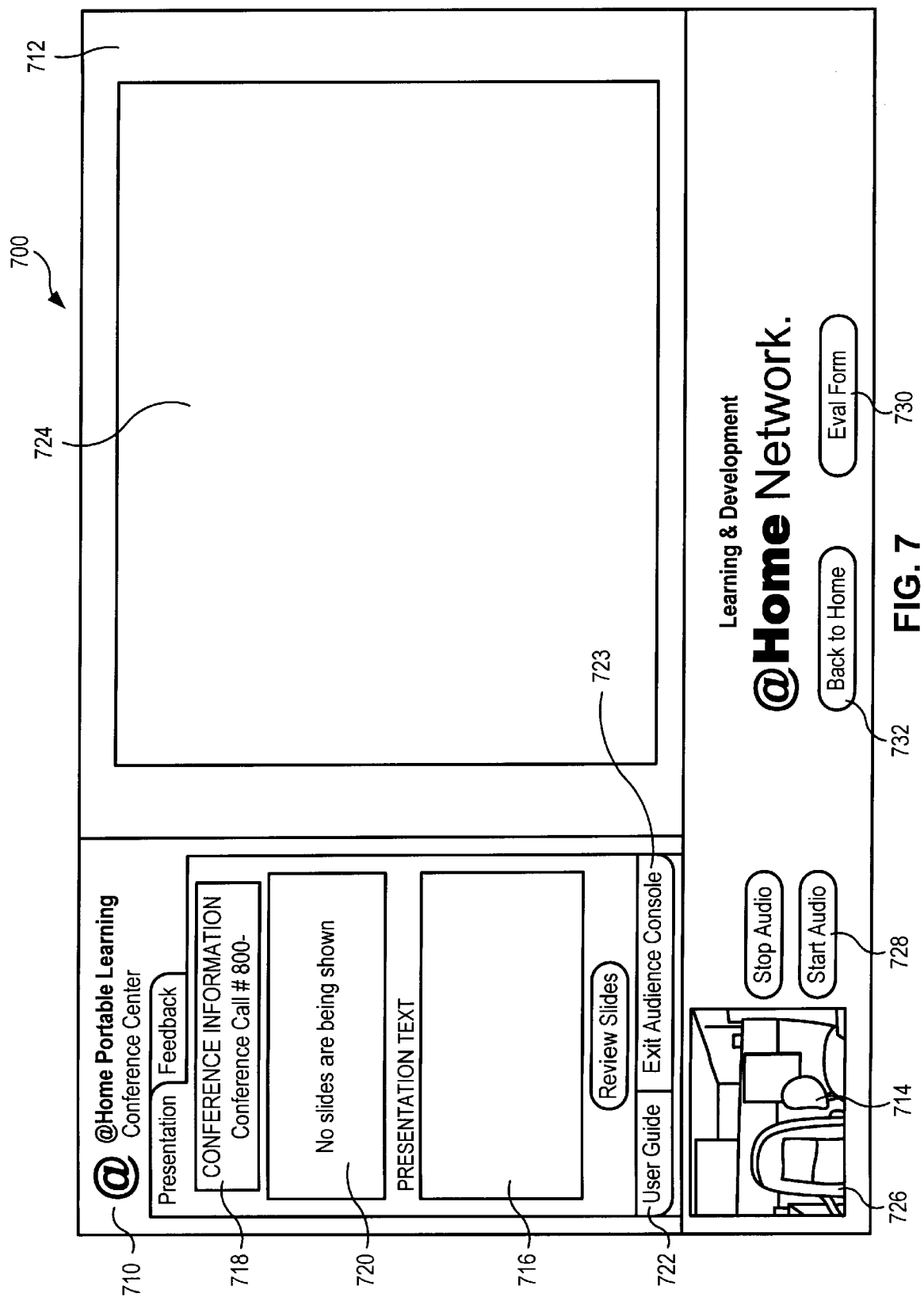

SYSTEM AND METHOD FOR DISTRIBUTED LEARNING

BACKGROUND

1. Field of the Invention

This invention pertains in general to teaching and collaborative learning and in particular to a method and system for providing distributed skill-based training through the use of multiple streaming video feeds and data sharing over a network such as the Internet.

2. Background of the Invention

This present invention pertains to distributed skill-based training. Distributed training may occur in multiple locations simultaneously, like when a teacher teaches to multiple remote classrooms, or may occur in multiple locations independently, like when a user manual is released to the public. Often, such training is event-driven because it results from the occurrence of an event, like the completion of a project, that triggers a need to train people with certain skills. For example, once a software product is completed and released, there is typically a need to train people, including salespeople, technical support people, and users with the skills necessary to perform their roles. In another example, when a construction project, like the building of a dam or an airplane, is completed, there is a need to train people how to use the constructed asset.

Conventional training methods include providing manuals and/or classroom instruction. Manuals can be easily distributed to many people scattered in different locations. However, manuals are often not as effective as classroom instruction because the material may be boring and there is a lack of audience member-teacher-classroom interaction. Classroom instruction may be effective, but it is often difficult, costly, and inconvenient to arrange for many people from disparate locations to meet together for a training session.

To solve the problem of bringing people together, complex technologies have been developed to facilitate distributed learning. One such technology uses satellite broadcasts or other closed-circuit links to provide two-way video and audio communication between a teacher at a broadcast center with audience members at one or more remote classrooms. However, this solution is less than ideal because it requires specialized hardware to be present at the teacher's location and at each classroom.

Other solutions use specialized software programs executing on computer systems in an attempt to simulate the classroom experience. Since the software is specialized, each audience member must have access to the software and a network connection before connecting to the "classroom." This software is often expensive, resulting in a high cost to the audience member. In addition, the software may introduce compatibility and support problems.

Moreover, these solutions require the teachers and audience members to engage in unusual behavior that detracts from the learning experience. For example, some solutions do not support full-duplex communications and require the teachers and audience members to use a "walkie-talkie-" like communication interface.

Likewise, the audience members must devote time to learning the communications tools instead of learning the intended skills. All of the above-described problems are barriers to natural communication between the teachers and the audience members and often result in decreased learning. In order to provide an effective lesson, the teacher must be an expert with the teaching tools in addition to the subject matter of the training.

Accordingly, there is a need for a system and method for distributed skills-based training that provides the benefits of classroom interaction without the detrimental effects of complicated hardware or software, or the costs and inconvenience of convening in a separate place.

SUMMARY OF THE INVENTION

The above needs are met by a distributed learning system that uses industry-standard computer hardware and software linked by a network like the Internet to provide a classroom- or auditorium-like metaphor to at least one presenter and at least one audience member. The distributed learning system can simultaneously support up to thousands of participants. The presenter uses a presenter computer system and the audience member uses an audience member computer system. Each of these computer systems is linked to at least one distributed learning server via the network.

The distributed learning server includes distributed learning control modules, classroom environment modules, and streaming data modules. Distributed learning control modules control the interactions between the other modules and the various presenter and audience computer systems coupled to the distributed learning server. In addition, distributed learning control modules provide security by authenticating the presenter and, if necessary, audience members. Distributed learning control modules also allow the presenter to pre-select sources of streaming data, such as digital video feeds, that will be used in the presentation. The pre-selected sources may be sources that are coupled to a presenter or audience member computer system or sources that are connected to the network through another means.

Classroom environment modules provide a classroom- or auditorium-like metaphor to the participants coupled to the distributed learning server. The classroom metaphor preferably provides a map of the classroom showing the relative relationships among presenters and audience members. The presenter can elicit feedback from the audience by asking questions, and the audience members can indicate responses by activating color-coded icons. In addition, audience members can "chat" among themselves or with presenters by exchanging text messages. The classroom environment modules also give the presenter the ability to control the content that appears on the audience members' computer systems.

The streaming data modules provide one or more streaming data feeds from the selected sources to the presenter and audience computer systems. In one embodiment, a digital video camera at the presenter computer system provides a streaming video image of the presenter to the distributed learning server. Upon the direction of the presenter, the streaming data module provides the video feed to the audience members' computer systems. If the presenter selects a different streaming data source, the presenter and the audience members' computer systems receive the different streaming data source.

The presenter and audience member computer systems are preferably industry-standard personal computer systems capable of browsing the World Wide Web on the Internet, executing JAVA instructions, and receiving data from the distributed learning server. The browser creates a display on the computer system that is divided into several different regions. The presenter computer system preferably displays content selection, first streaming media, second streaming media, and feedback regions. The content selection region includes a tool allowing the presenter to select the streaming feed that appears in the first streaming media region and is sent to the audience member computer systems. Similarly, the second streaming media region includes a second streaming media content selection tool controlling the content shown in a second streaming media region. Preferably, the second streaming media feed uses less network bandwidth than the first streaming media window and may be used to support video feeds that would use prohibitively high bandwidth if sent at the same data rate as the first streaming media region. The feedback region preferably displays a graphical representation of the classroom and indicates feedback provided by the audience members.

The audience member computer system display preferably includes presentation/feedback, first streaming media, and second streaming media regions. The presentation/feedback region displays textual information provided by the presenter or another audience member. In addition, the presentation/feedback region displays feedback tools that the audience member can use to provide feedback to the presenter. The first and second streaming media regions display the content that the presenter selects using the first and second streaming media selection tools.

Preferably, the displays on the presenter and audience computer systems have a fixed browser window size and a minimum display resolution. In this manner, each type of participant can be assured of having an identical display. Such uniformity enhances the learning experience because it allows the participants to focus on the presentation, rather than concern themselves with the particularities of the computer system.

BRIEF DESCRIPTION OF THE DRAWINGS

FIG. 7 illustrates an exemplary screen display on the audience member computer system.

DETAILED DESCRIPTION OF THE PREFERRED EMBODIMENT

Figure 1:
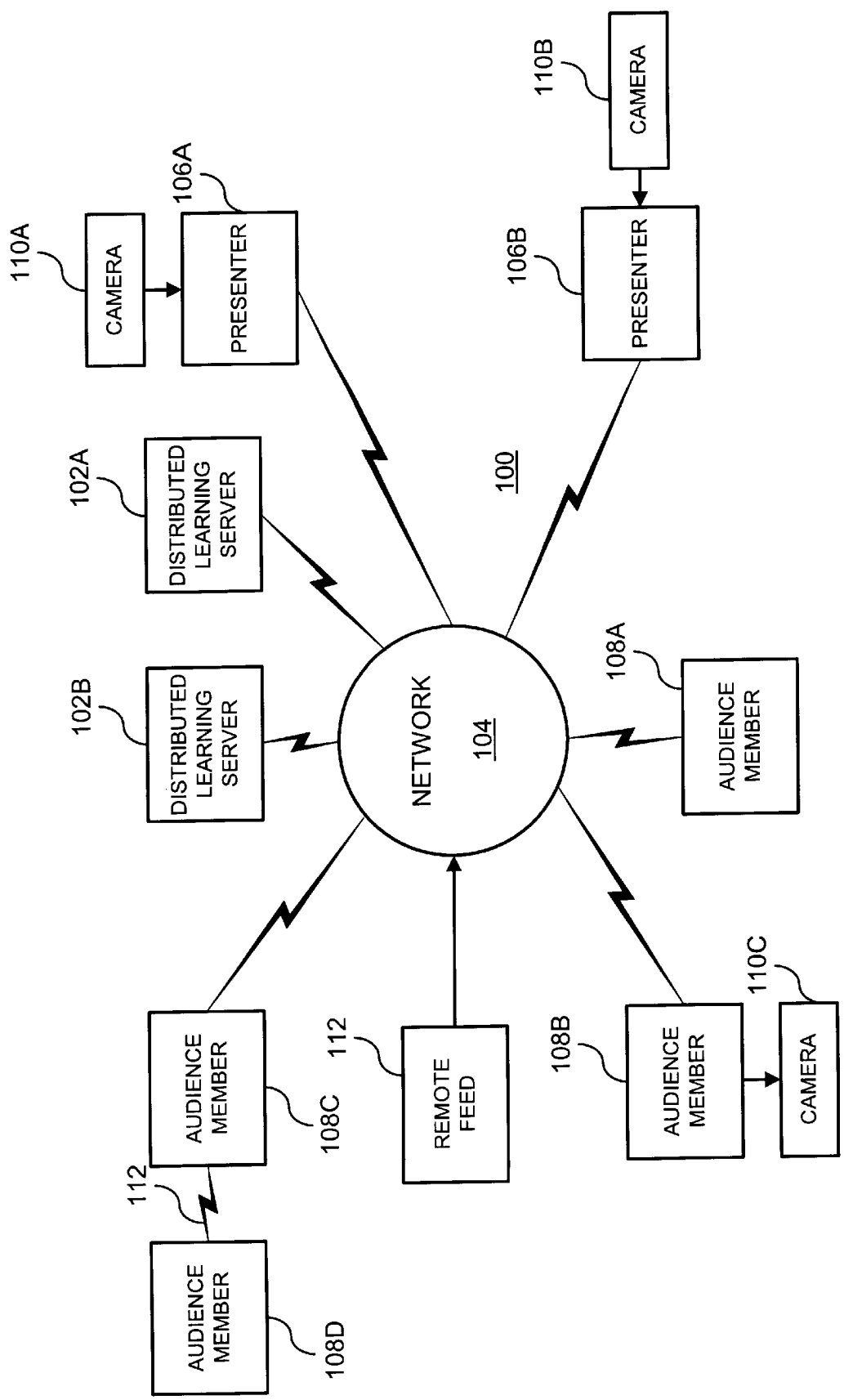
FIG. 1 is a block diagram illustrating a typical hardware environment for executing a distributed learning system according to an embodiment of the present invention.

FIG. 1 is a block diagram illustrating a typical hardware environment for executing a distributed learning system 100 according to an embodiment of the present invention. One or more distributed learning servers (DLS) 102A–B are coupled to a network 104 in addition to one or more presenter computer systems 106A–B. Although only two DLS 102A–B are shown in FIG. 1, it should be understood that there can be any practical number of DLS working either separately or in tandem to provide the functionality described herein. Likewise, although only two presenter computer systems 106A–B are illustrated in FIG. 1, it should be understood that there can be any practical number of presenters and associated presenter computer systems 106. Similarly, four audience member computer systems 108A–D are shown coupled to the network 104, although there can also be any practical number of audience members and associated audience member computer systems 108. The audience members and presenters are collectively referred to as the "participants."

The network 104 is preferably the Internet. However, any local or wide area network may be used to support the distributed learning system as 100 described herein. In addition, the network 104 may be a dedicated subset of the Internet having specialized hardware allowing high-speed uni- or bi-directional communication.

Figure 2:
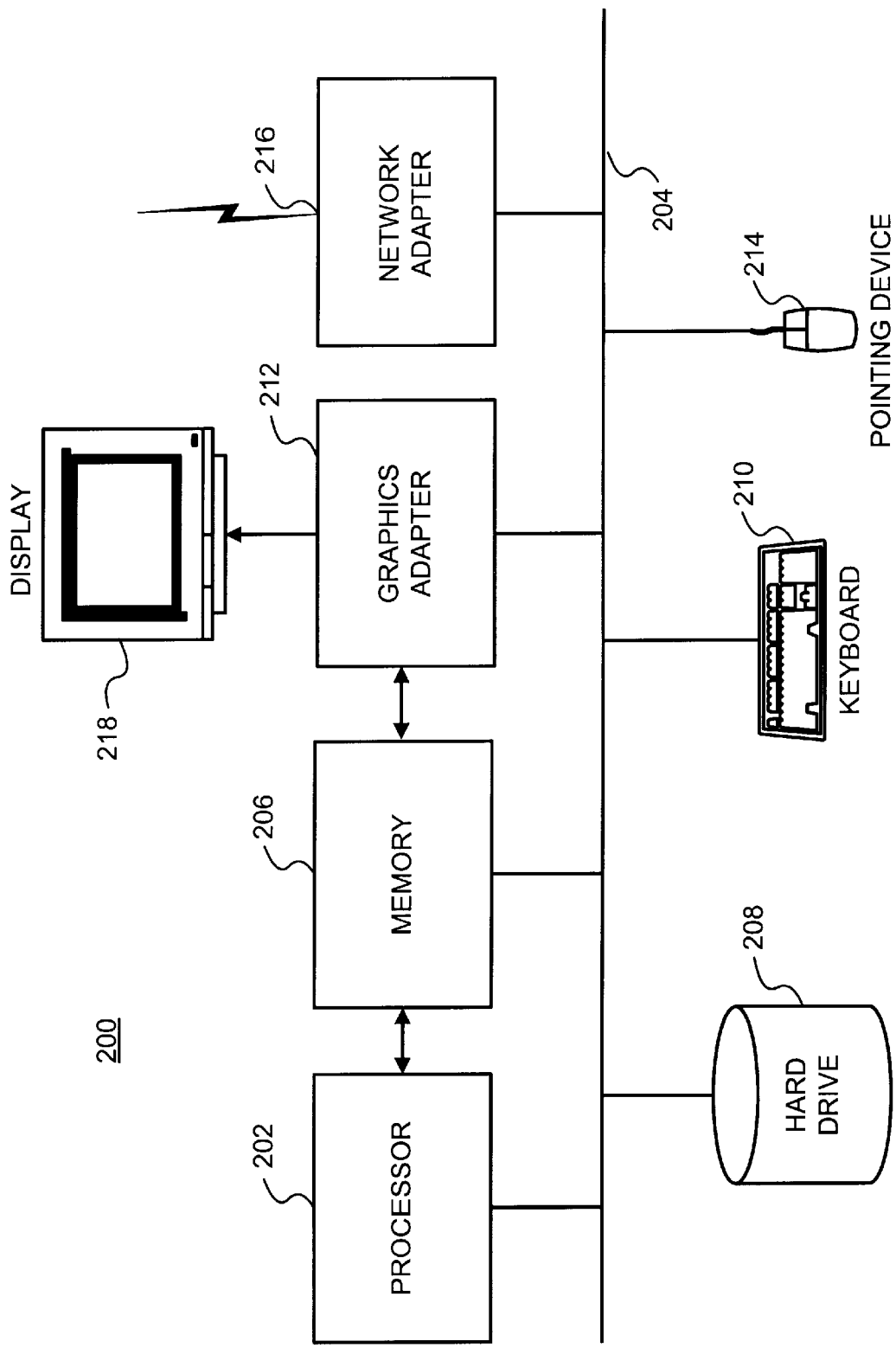
FIG. 2 is a high-level block diagram illustrating a typical computer system for implementing a distributed learning server and presenter and audience member computer systems.

FIG. 2 is a high-level block diagram illustrating a typical computer system 200 for implementing the DLS 102, presenter 106, and audience member 108 computer systems. FIG. 2 illustrates a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212. The processor 202 may be any general-purpose processor such as an INTEL® x86 compatible or SUN MICROSYSTEMS SPARC® central processing unit (CPU). The storage device 208 may be any device capable of holding large amounts of data, like a hard drive, compact disk read-only memory (CD-ROM), DVD, or some form of removable storage device. The memory 206 holds instructions and data used by the processor 202. The pointing device 214 may be a mouse, track ball, light pen, touch-sensitive display, or other type of pointing device and is used in combination with the keyboard 210 to input data into the computer system 200. The graphics adapter 212 displays images and other information on the display 218. The network adapter 216 couples the computer system 200 to the network 104 and may be, for example, a token-ring, Ethernet, or digital subscriber line adapter or a cable or high-speed analog modem.

As understood in the art, the functionality of the DLS 102, presenter 106, and audience member 108 computer systems described below may be performed by software or hardware modules within the computer systems. The modules according to one embodiment are software programs stored on the storage device 208, loaded into the memory 206, and executed by the processor 202. Moreover, the presenter 106 and audience member 108 computer systems are distinguished primarily by use. The computer systems may be substantially identical and be used for different roles at different times.

The DLS 102 acts as the server for the distributed learning system 100 and relays information transmitted among the presenter 106 and audience member 108 computer systems. As illustrated in FIG. 1, multiple DLS 102 may be coupled to the network 104. In one embodiment, the DLS 102 work together to provide distributed learning to multiple participants engaged in a single distributed learning session. In this embodiment, the processing load may be shared among the DLS 102 through the use of a load-balancing algorithm or similar technique. In another embodiment, the DLS 102 support multiple simultaneous distributed learning sessions. In this embodiment, each DLS 102A–B may support a single distributed learning session or a plurality of concurrent distributed learning sessions.

The presenter computer system 106 is used by the presenter to communicate with the audience members and control information that appears on the audience member computer systems 108. A video camera 110 is preferably coupled to the presenter computer system 106 and provides a real time streaming digital video feed from the presenter to the DLS 102. Another input device reproducing a digital feed may be coupled to the presenter computer system 106 in addition to or in place of the video camera, including, for example, an oscilloscope, an electron scanning microscope, a microphone, or any other device providing a live or pre-recorded output that can be converted to digital data.

Similarly, an audience member uses the audience member computer system 108 to receive the presentation from the presenter and communicate with the presenter and other audience members. The audience member computer systems 108 may be organized as a local area network 112 sharing a common link to the network 104. In FIG. 1, for example, audience member computer systems 108C and 108D are linked in a local area network 112. This configuration may be used, for example, when a classroom of linked computers is assembled at a location remote from the presenter. In addition, a video camera 110C or input device may also be coupled to a student computer system 108B.

Zero or more remote feeds 112 are also coupled to the network 104. As used herein, the term "remote" means that the device or feed is not connected to the network 104 through a presenter 106 or audience member 108 computer system. A remote feed 112 may be a video camera providing a digital feed similar the camera 110 coupled to the presenter computer system 106 or the remote feed 112 may be some other form of live or pre-recorded streaming data. The remote feed 112 may be coupled to the network 104 through another computer system or through some other form of addressable network interface 104.

Figure 3:
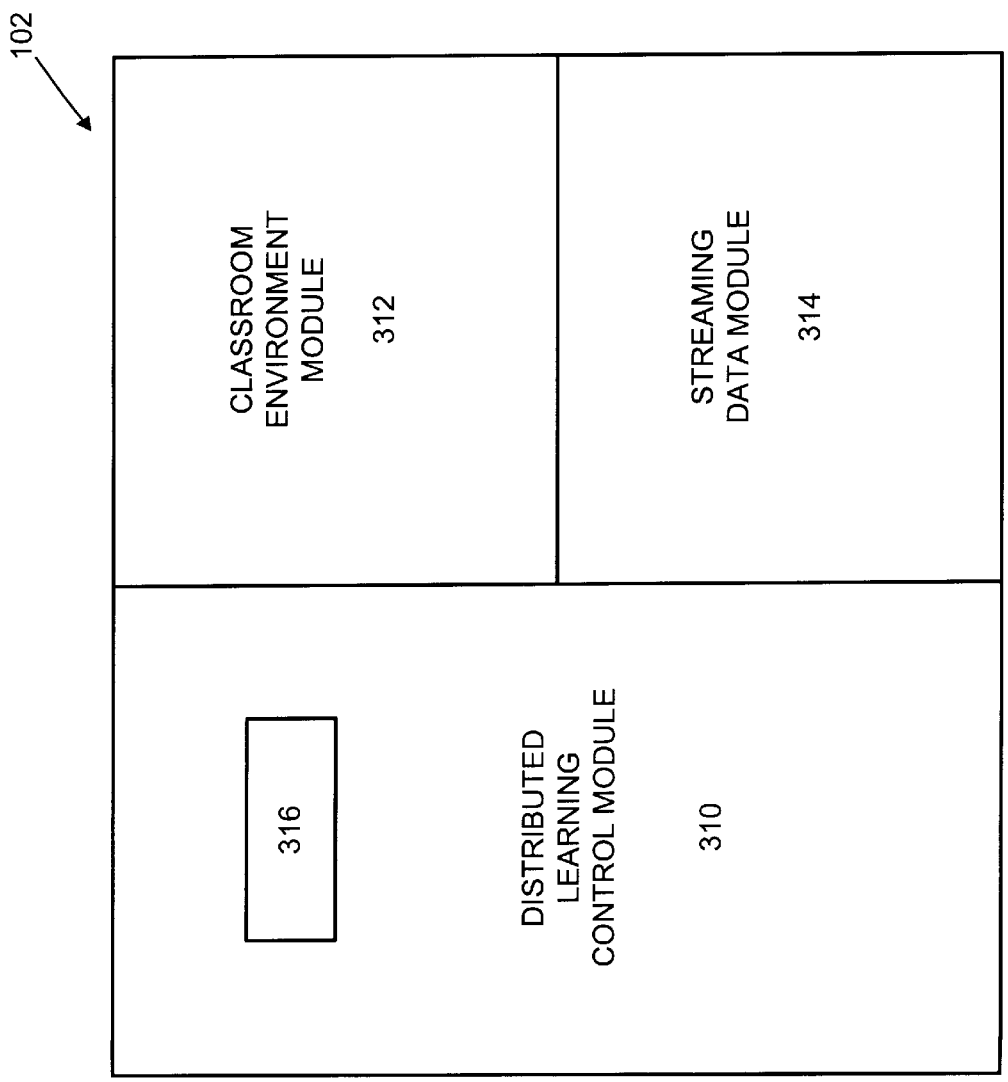
FIG. 3 is a block diagram illustrating the functional units of the distributed learning server according to an embodiment of the present invention.

FIG. 3 is a block diagram illustrating the functional units of the DLS 102, including a distributed learning control module (DLCM) 310, a classroom environment module 312, and a streaming data module 314. The DLCM 310 controls the communications among the various computer systems 106, 108 in the distributed learning system 100 and manages the other modules in the DLS 102. A preferred embodiment of the DLCM 310 executes an operating system like MICROSOFT WINDOWS NT® or SUN MICROSYSTEMS SOLARIS® 2.x and uses a hypertext transport protocol (HTTP)-based web server, like NETSCAPE ENTERPRISE SERVER 2.0 or the APACHE web server, to receive and respond to requests for data from the other computer systems 106, 108.

In addition, the DLCM 310 preferably includes software written in JAVASCRIPT and C++ providing auto-sensing capabilities for verifying that the participants' computer systems 106, 108 meet the hardware and software requirements for participating in the distributed learning session. For example, the auto-sensing capabilities determine whether the participants' computer systems 106, 108 support the correct display settings, browser and JAVA versions, and needed bandwidth. Moreover, the DLCM 310 software preferably provides the participants' computer systems 106, 108 with the instructions for creating the properly-sized program windows and controls the content displayed therein. The DLCM 310 also includes authentication services for providing security to the participants and provides a presenter with streaming media selection functionality to enable configuring streaming media networks in an ad hoc fashion. The capabilities and controls supplied by the DLCM 310 are described in more detail below.

The classroom environment module 312 provides a classroom- or auditorium-like metaphor to the presenter and audience members coupled to the DLS 102, and a preferred embodiment of the classroom environment module 312 uses the PLACEWARE™ software product manufactured by PlaceWare, Inc., Mountain View, Calif. As used herein, the term "classroom" refers to an at least partially virtual space in which participants can interact. For example, in one embodiment the classroom environment module 312 provides a virtual room having a "podium" and "rows of seats." One or more presenters typically "stand" at the podium while the audience members "sit" in the seats. The classroom environment module 312 provides the presenter and audience member computer systems with a map of the virtual classroom, and identifies the locations of the presenters and audience members on the map. The audience members communicate with each other and the presenter by either changing the color of their seat on the map, or by passing messages to selected people in the room. In addition, the classroom environment module 312 provides advanced audience member feedback, including the ability to take instant polls of the audience members and graphically display the results to the presenters and audience members.

Moreover, the classroom environment module 312 provides the presenters with control over the information that appears on the audience members' computer systems. For example, a presenter may provide a MICROSOFT POWERPOINT® slide presentation to the audience members. Similarly, the presenter may cause the audience members to view a particular Internet web page. In addition, the presenter may draw over the displayed material and have the drawings appear on the audience members' computer systems in real time. This control is described in more detail below.

In addition to the control provided by the classroom environment module 312, the streaming data module 314 provides one or more streaming data feeds to the presenter 106 and audience member 108 computer systems. As used herein, "streaming" refers to serial or parallel transmission of digital data between two computers by transmitting sequences of live or pre-recorded bit packets. A preferred embodiment of the streaming data module 314 uses the GTS Audio and Video Servers from Graham Technology Solutions, Inc., Cupertino, Calif. The streaming data module 314 receives streaming data, including video and audio data, from a computer system 106, 108 or remote feed 112 coupled to the network 104 and provides it to the other computer systems 106, 108.

In one embodiment, the DLS 102 provides the presenter with administration tools allowing the presenter to configure a presentation. For example, the web pages allow the presenter to provide presentation materials that a participant can print out or review ahead of the scheduled session, a title for the presentation, information such as the phone number for the audio portion of the presentation, and any other information necessary to schedule and conduct the presentation. Preferably, a security module 316 within the DLCM 310 authenticates the presenter through the use of a login/ password pair or some other technique to ensure that the presenter has sufficient security clearance to perform these actions.

In a preferred embodiment of the present invention, the administration pages of the DLS 102 also allow the presenter to pre-select the sources of data that will be used in the presentation. For example, the presenter may wish to pre-select a camera 110 coupled to the presenter's computer system 106 as a video source for the presentation. Alternatively, the presenter may wish to pre-select a source of data from one or more remote live or pre-recorded feeds 112.

Figure 4:
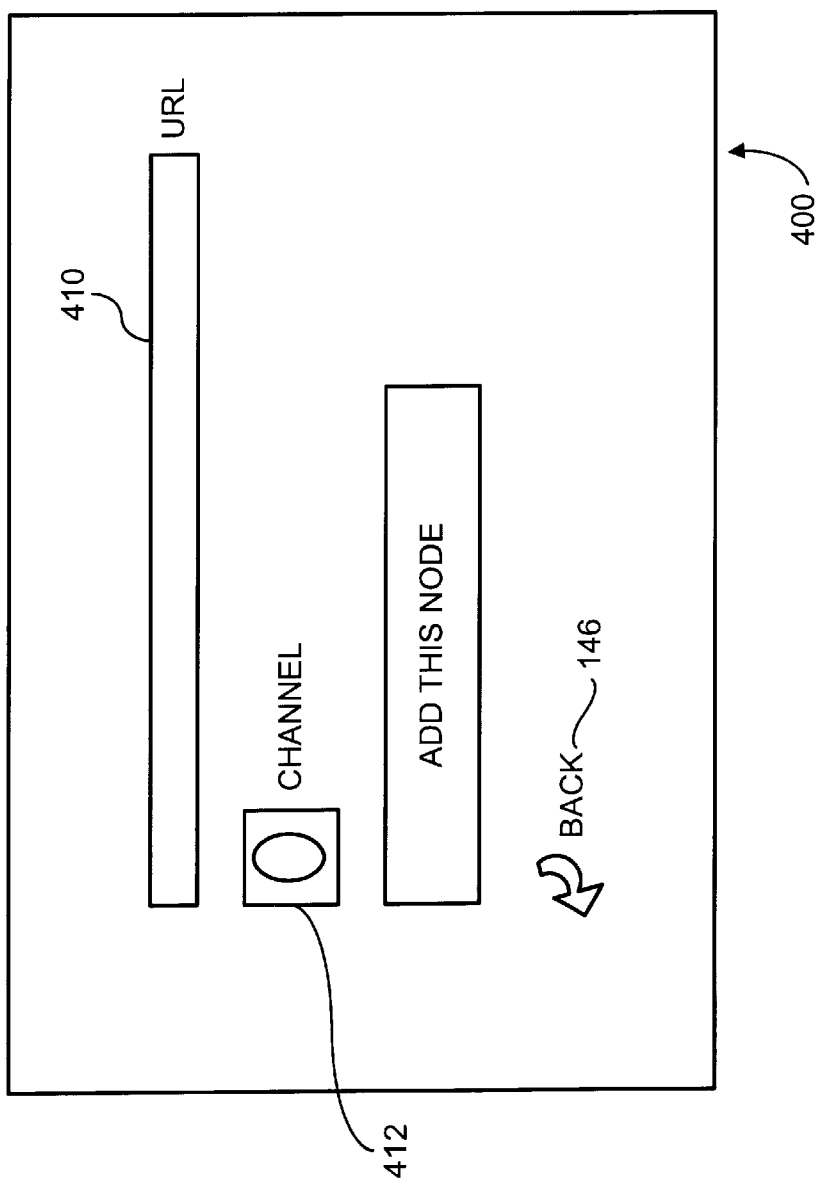
FIG. 4 illustrates a representative display according to an embodiment of the present invention for allowing a presenter to select a source of data.

FIG. 4 illustrates a representative display 400 displayed on the presenter computer system 106 under direction of the DLCM 310 according to an embodiment of the present invention for allowing a presenter to define and select a source of data. The display 400 includes an "address" field 410 for allowing the presenter to submit the address on the network 104 of the source of data. In a preferred embodiment, the address is in the form of a Internet Protocol address or Domain Name System (DNS) name specifying a location of the source of data on the Internet. In an alternative embodiment, the address may be a numeric, nickname or shortened address whose meaning is understood by the DLS 100 to refer to a particular source of data. The display 400 also includes a "channel" field 414 allowing the presenter to select a channel of a multichannel source of data. Once the presenter has properly identified the source of data, the presenter selects the "add this node" button 414 to post the data to the DLS 102. Then, the presenter may select the "back" link 416 to return to the other administration tools.

Figure 5:
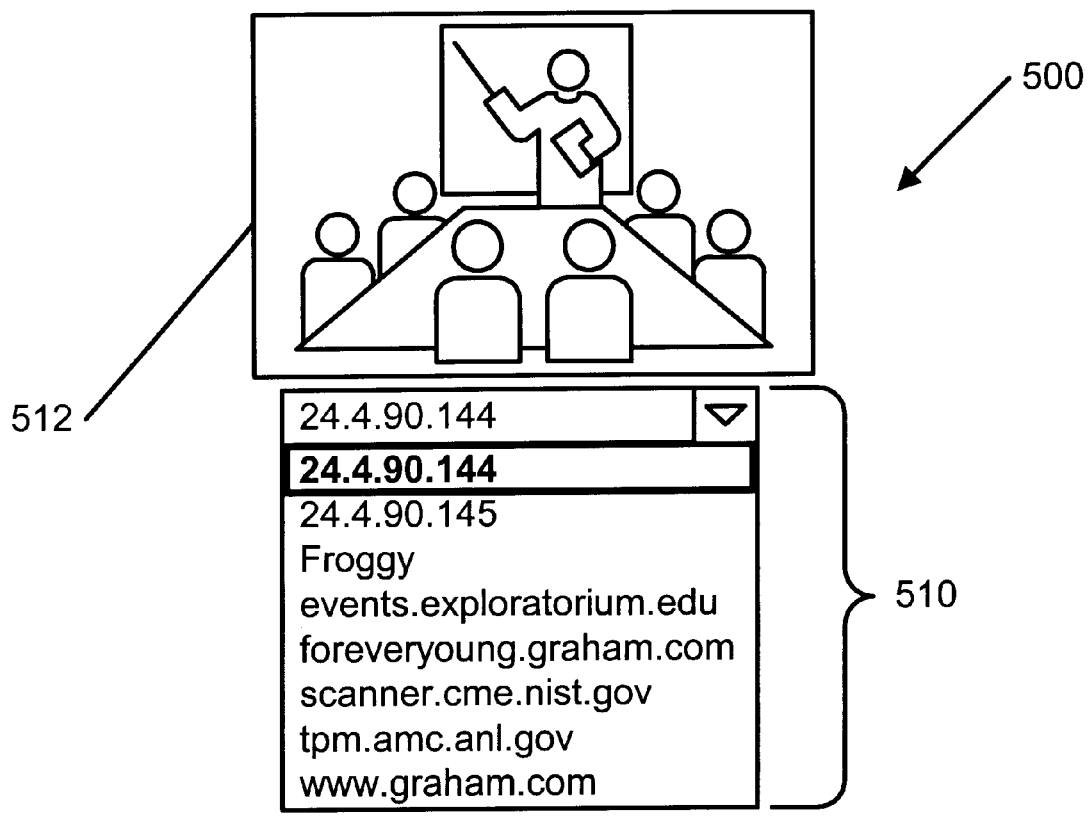
FIG. 5 illustrates a representative display according to an embodiment of the present invention for allowing a presenter to view the selected sources of data.

FIG. 5 illustrates a representative display 500 displayed on the presenter computer system 106 under direction of the DLCM 310 according to an embodiment of the present invention for allowing a presenter to view the selected sources of data. The display 500 includes a list box 510 listing the sources of data that were previously selected via the display 400 illustrated in FIG. 4. A media window 512 displays the current feed received from the source of data selected in the list box 510. In the representative display 500 of FIG. 5, the source of data having the address "24.4.90.144" is selected in the list box 510 and the data from that source, a video stream, is displayed in the media window 512. By using this display 500, the presenter can preview the pre-selected sources of data before starting the presentation.

Figure 6:
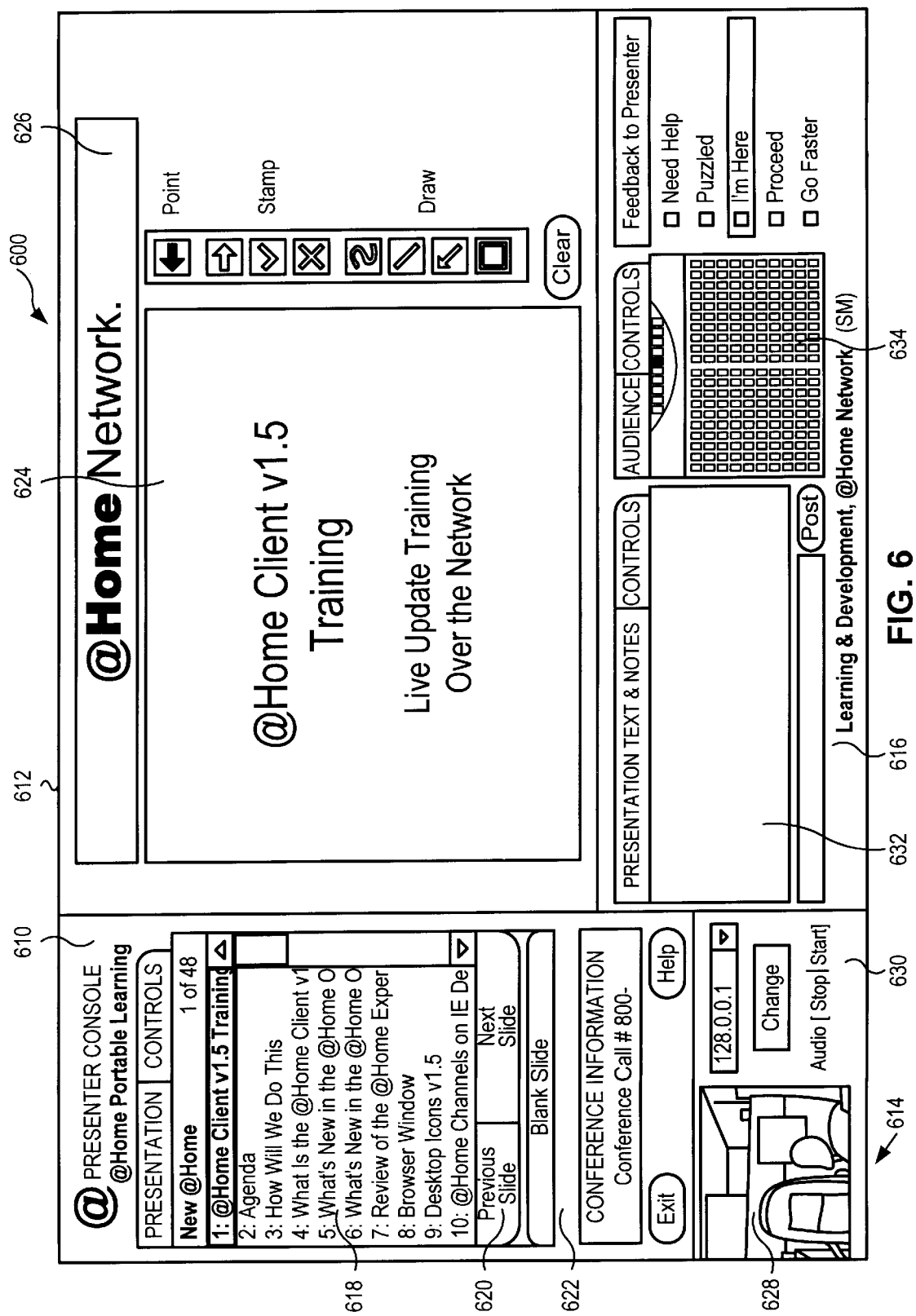
FIG. 6 illustrates an exemplary screen display on the presenter computer system.

FIG. 6 illustrates an exemplary display 600 on the presenter 106 computer system and FIG. 7 illustrates an exemplary display 700 on an audience member 108 computer system. Both the presenter 106 and audience member computer systems preferably execute a JAVA®-enabled web browser or operating system, like NETSCAPE COMMUNICATOR®, MICROSOFT INTERNET EXPLORER®, or MICROSOFT WINDOWS 98. In each computer system 106, 108, the browser or operating system connects to the DLS 102, receives data in the form of hypertext markup language (HTML) instructions and JAVA code, and creates the illustrated display. The illustrated display represents a preferred embodiment of the present invention, although variations in the placement and function of displayed elements are possible.

In a preferred embodiment of the present invention, the display 600 on the presenter computer system has a fixed height and width, which in one embodiment is 1024×768 pixels. Fixing the size of the presenter display 600 assures that presenters have a reliable, stable, and consistent user interface, which results in improved ease of use for the presenter. The display 600 is preferably divided into separate regions of fixed size by browser frames, window borders, or another graphical border demarcation.

The content selection region 610 of the presenter is preferably located at the upper-left area of the display 600. The presenter uses this region 610 to control the content visible at the presenter 106 and audience member 108 computer systems in the first streaming media region 612. Within the content selection region 610 are a content selection list box 618, a classroom control window 620, and a classroom information window 622. The content selection list box 618 contains a list of possible sources for the first media region 612. For example, the list box 618 may contain a list of video feeds pre-selected using the administration tools as described above with respect to FIGS. 4 and 5, web sites, or slides available to the presenter. When a particular item is selected from the content selection list box 618, the content is displayed in the first media region 612, 712 of the presenter 106 and audience member 108 computer systems.

The classroom information window 622 provides information about the presentation currently in progress. For example, in a preferred embodiment of the present invention, the audio portion of the presentation is carried over a telephone network separate from the network 104 carrying the other data. In this embodiment, the window 622 may provide a telephone number that a participant can call to hear the audio portion of the presentation. In an alternative embodiment where audio is transmitted over the network 104, the window may provide a telephone number that a participant can call should that participant's computer system lack audio capabilities or the window may provide other information.

The first media region 612 is preferably located at the upper-right area of the display and preferably contains the first media window 624 and the first media window controls 626. The first media window 624 displays the content selected in the content selection list box 618. As mentioned above, the displayed content may include a video feed, a slide show, a web page, a white board with real-time updates, or some other form of graphical information. In the embodiment where the displayed content is generated at the presenter's computer system 106, the content is preferably displayed in the window 624 as it is sent to the DLS 102 for distribution to the other computer systems coupled to the network 104. In the embodiment where the displayed content is received from outside the presenter's computer system 106, like when the content is a web page or a video feed from a remote location, the content is preferably displayed in the window 624 as it is received from the DLS 102.

The first media window controls 626 provide tools for controlling and modifying the content of the first media window 624. In one embodiment, the controls 626 provide pointer and drawing tools that the presenter uses to identify or mark portions of the displayed content. For example, the presenter can use the streaming media window controls 626 to draw on a displayed slide. The drawing is communicated to the audience member computer systems 108 and displayed in real time.

The second media region 614 is preferably located at the lower-left area of the display 600 and preferably contains the second media window 628 and the second media window content list box 630. The second media window 628 preferably displays the same types of content as the first media window 624. Since the second streaming media window 628 is smaller than the first 624, the second window 628 is more suitable for live video and other streaming feeds that might exceed the available bandwidth of the network 104 if supporting the data rate of the first media window 624. The second media window content list box 630 preferably displays the sources of data pre-selected by the presenter and controls the source of the content displayed in the second media window 628.

The feedback region 616 is preferably located at the lower-right area of the display 600 and allows the presenter to receive feedback from the audience members. Within the feedback region 616 are the presentation text window 632 and the audience member response window 634. The presentation text window 632 allows the presenter to pass text messages to the other computer systems. In one embodiment of the present invention, the presenter enters the text message into a text field and then enters a "post" command that passes the message to the other computer systems.

The audience member response window 634 preferably provides a seating chart showing the audience members and presenters in the classroom or auditorium. In one embodiment of the present invention, the seating chart provides a colored box for each participant. Participants can communicate messages like "I'm here," "I need help," and "go faster" to the presenter by changing the color of the box. A key preferably displayed adjacent to the seating chart explains the meaning of each color.

Turning to FIG. 7, in a preferred embodiment of the present invention, the audience member display 700 is fixed at 800×600 pixels and is chromeless, i.e. lacks certain window and menu bar controls. The display 700 is divided into separate regions of fixed size by using browser frames or another graphical demarcation of the region borders. The upper left area of the display 700 is the presentation/feedback region 710. The upper right area is the first streaming media region 712 and the lower portion is the second streaming media region 714.

The audience member uses the presentation/feedback region 710 to view presentation text provided by the presenter, provide feedback to the presenter, and communicate with other audience members. In presentation mode, the region 710 has a presentation text window 716 that displays the text transmitted by the presenter via the presenter presentation text window 632. The region also has a classroom information window 718 that displays the information about the presentation currently in progress entered by the presenter in window 622. Similarly, the region also has a presentation information window 720 that displays the title of the presentation, name of the presenter, or other information selected by the presenter.

A "user guide" button 722 allows the audience member to display a second window having content dynamically controlled by the presenter. For example, the user guide button 722, when activated during the beginning of the presentation, could display a problem set provided by the presenter. When activated later in the presentation, the user guide button might display the answers to the problem set. Similarly, the presenter can configure the user guide button to provide additional information not provided in the presentation or any other information which the presenter wishes to provide to the audience members. An "exit console" button 723 allows the audience member to exit from the current presentation and close the window.

In feedback mode, the region 710 displays tools allowing the audience member to provide feedback to presenters. For example, the region 710 may display radio buttons allowing the audience member to rate his or her satisfaction with the current presentation. This feedback is reflected in the presenter's feedback region 616. In communication mode, the region 710 preferably displays a list of participants with whom the audience member may conduct a chat session and a text window displaying communicated text. In one embodiment, the list displays the names of participants sitting in the same row as the audience member.

The first media region 712 contains the first media window 724, which displays the contents selected by the presenter via the content selection window 618. Similarly, the second media window 726 in the second media region 714 displays the contents selected by the presenter via the second media window content list box 630. Audio controls 728 adjacent to the second streaming media window allow the audience member to control the playing of the audio portion of the presentation.

An "evaluation" button 730 preferably causes an evaluation window to open. The audience member uses the evaluation window to provide feedback to the presenter on the usefulness of the presentation. In addition, a "home" button 732 preferably allows the audience member to leave the current presentation. In one embodiment, an audience member who presses the home button 732 is returned to a "conference center" from where the audience member can select another presentation.

The described distributed learning system 100 enhances the distributed learning experience because it allows remotely located presenters and audience members to engage in a traditional classroom discussion. Skills and behaviors learned by the participants in other learning environments, including real classrooms, are immediately applicable to the environment provided by the system. Since the provided tools are standardized and relatively easy to use, the participants can concentrate on the instruction rather than the technology. Moreover, since the provided tools are readily available and remove the obstacles of cost and inconvenience of convening audience members, presenters, and relevant experts, leaning sessions can more readily occur just as they are needed.

What is claimed is:

1. A method of conducting distributed learning among a plurality of computer systems coupled to a network, the method comprising the steps of:
   providing instructions to a first computer system coupled to the network for:
      creating a graphical display representative of a classroom;
      creating a graphical display illustrating controls for selecting first and second data streams;
      creating a first window for displaying the first selected data stream; and
      creating a second window for displaying the second selected data stream, wherein
         the first and second windows are displayed simultaneously; and
   providing instructions to a second computer system coupled to the network for:
      creating a graphical display representative of the classroom;
      creating a third window for displaying the first selected data stream; and
      creating a fourth window for displaying the second selected data stream, wherein
         the third and fourth windows are displayed simultaneously.

2. The method of claim 1, wherein the step of creating a second window for displaying the second selected data stream creates a smaller window using a lower data rate than the window for displaying the first selected data stream.

3. The method of claim 1, further comprising the step of:
   providing instructions to the first computer system coupled to the network for:
      creating a graphical display illustrating controls for locating a plurality of data streams;
      wherein the graphical display illustrating controls for selecting the first data stream illustrates controls for selecting among the located plurality of data streams.

4. The method of claim 3, wherein the step of creating a graphical display illustrating controls for locating a plurality of data streams comprises the step of:

creating a graphical display illustrating controls for locating a plurality of data streams originating remotely from the first and second computer systems.

5. The method of claim 1, wherein the step of creating a graphical display illustrating controls for selecting a first data stream comprises the step of:

creating a graphical display illustrating controls for selecting a data stream representative of video data;

wherein the windows on the first and second computer systems for displaying the first selected data stream display the video data.

6. The method of claim 1, wherein computer instructions for performing the method steps are encoded on a computer-readable medium.

7. The method of claim 1, wherein the step of providing instructions to a second computer system coupled to the network further comprises the steps of:

creating a fixed size browser window for displaying the graphical display representative of the classroom;

creating a fixed size browser window for displaying the first selected data stream; and creating a fixed size browser window for displaying the second selected data stream.

8. A system for conducting distributed learning among a plurality of computer systems coupled to a network, the system comprising:

a presenter computer system of the plurality of computer systems coupled to the network and comprising:

a content selection control for defining at least one remote streaming data source and for selecting one of the remote streaming data sources for viewing; and a presenter streaming data viewer for displaying data produced by the selected remote streaming data source;

an audience member computer system of the plurality of computer systems and coupled to the presenter computer system via the network, the audience member computer system comprising:

an audience member streaming data viewer for displaying the data produced by the selected remote streaming data source; and a distributed learning server remote from the presenter and audience member computer systems of the plurality of computer systems and coupled to the presenter computer system and the audience member computer system via the network and comprising:

a streaming data module for providing the streaming data from the remote streaming data source selected with the content selection control to the presenter and audience member computer systems; and a distributed learning control module for receiving communications transmitted between the presenter and the audience member computer systems and for relaying the communications to an intended receiving computer system and for coordinating the operation of the streaming data module.

9. The system of claim 8, wherein the distributed learning server further comprises:

a classroom environment module for providing a representation of a classroom to the presenter and audience member computer systems.

10. The system of claim 9, wherein the presenter computer system and the audience member computer system each further comprises:

a graphical representation of a classroom.

11. The system of claim 10, wherein the graphical representation of a classroom further includes a plurality of icons representative of audience members, wherein the color of each icon indicates a particular audience member response.

12. The distributed learning server of claim 11, wherein the module for providing a second graphical display on the audience member computer system comprises a Java-compatible Web browser.

13. The system of claim 8, wherein at least one of the defined remote streaming data sources provides data representative of a video signal.

14. The system of claim 13, wherein the presenter streaming data viewer and the audience member streaming data viewer display data produced by a new selected remote streaming data source responsive to, and substantially simultaneously with, the selecting of the new remote streaming data source with the content selection control.

15. The system of claim 8, wherein the distributed learning server further comprises a module for verifying that the audience member computer system meets hardware and software requirements for displaying the data produced by the selected remote streaming data source.

16. The system of claim 8, wherein the distributed learning server simultaneously hosts a plurality of separate distributed learning sessions.

17. A distributed learning server for controlling a presenter computer system and an audience member computer system coupled to the distributed learning server via a network, the distributed learning server comprising:

a module for providing a first graphical display on the presenter computer system, the first graphical display comprising:

a first presenter content selection control for selecting a first source of streaming content representative of graphical information;

a first presenter content display region for displaying the graphical information represented by the streaming content from the first selected source;

a second presenter content selection control for selecting a second source of streaming content representative of graphical information; and a second presenter content display region for displaying the graphical information represented by the streaming content from the second selected source, wherein the first and second presenter content display regions are adapted to display simultaneously; and a classroom region for representing the audience member computer system coupled to the distributed learning server; and a module for providing a second graphical display on the audience member computer system, the second graphical display comprising:

a first audience member content display region for displaying the graphical information represented by the streaming content from the first source selected by the content selection control; and a second audience member content display region for displaying the graphical information represented by the streaming content from the second source selected by the content selection control, wherein the first and second audience member content display regions are adapted to display simultaneously.

18. The distributed learning server of claim 17, wherein the first graphical display further comprises:

a control for defining a plurality of sources of streaming content representative of graphical information;

wherein the first presenter content selection control allows selection of one of the defined plurality of sources of streaming content.

19. The distributed learning server of claim 17, wherein the second presenter content display region has a smaller window size and a lower data rate than the first presenter content display region.

20. The distributed learning server of claim 17, wherein a source of streaming content available for selection by the content selection control is a video camera coupled to the presenter computer system.

21. The distributed learning server of claim 17, wherein a source of streaming content available for selection by the content selection control is remote from the presenter computer system and the audience member computer system.

22. The distributed learning server of claim 17, further comprising:

a module for authenticating a user of the presenter computer system to prevent unauthorized use of the content selection control.

23. The distributed learning server of claim 17, wherein the source of streaming content representative of graphical information is pre-recorded.

24. The distributed learning server of claim 17, wherein the module for providing a first graphical display on the presenter computer system comprises a Java-compatible Web browser.

* * * * *